April 27, 1971  G. B. CLARK ET AL  3,576,688
METHOD FOR HEAT SEALING SEMIPERMEABLE MEMBRANES
Original Filed May 24, 1967
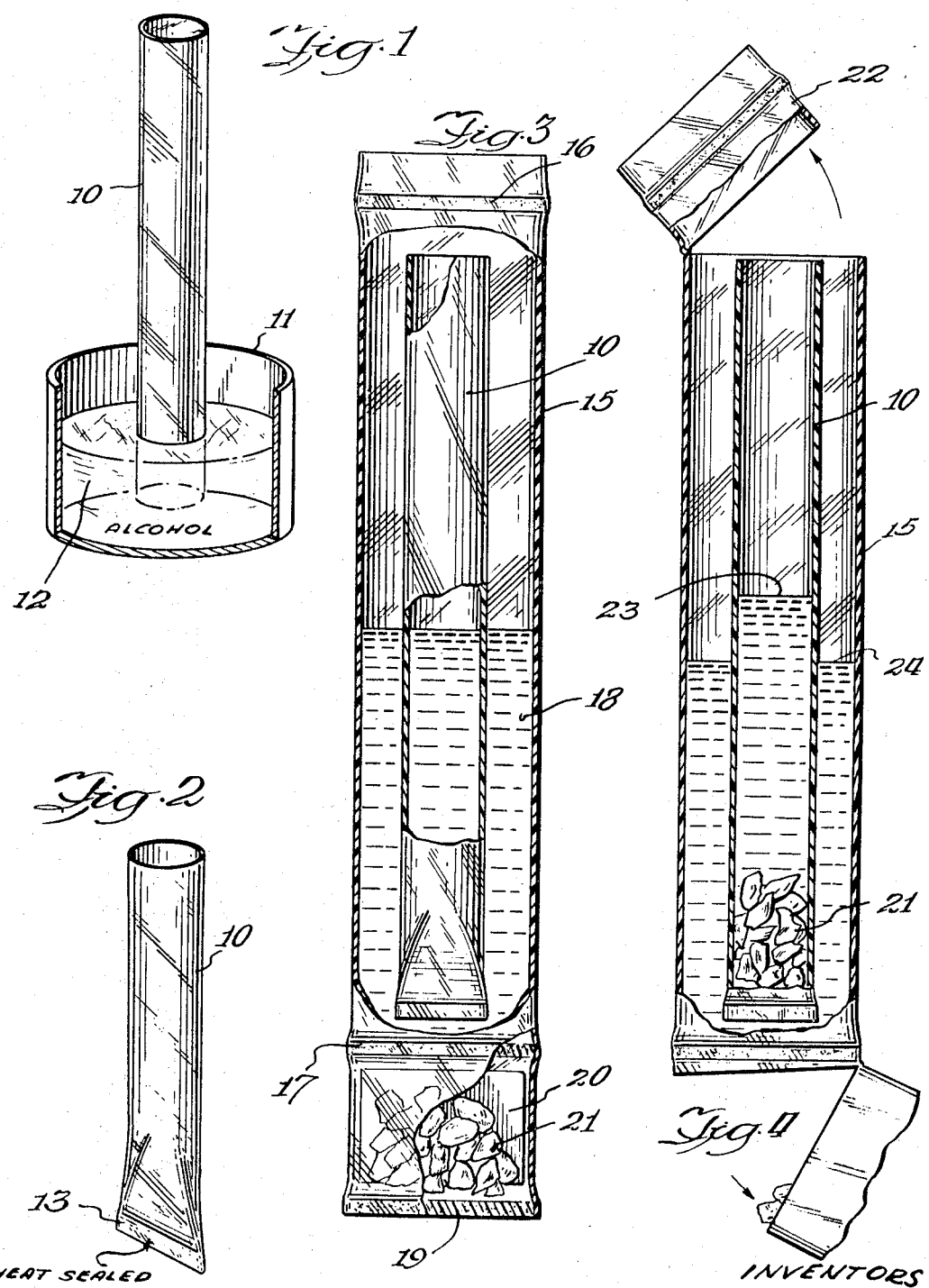
INVENTORS
George B. Clark
James A. Kavanagh United States Patent Office 3,576,688
Patented Apr. 27, 1971

3,576,688
METHOD FOR HEAT SEALING SEMIPERMEABLE MEMBRANES
George B. Clark, Poway, Calif., and James A. Kavanagh, Waukesha, Wis., assignors to Aqua-Chem, Inc.
Original application May 24, 1967, Ser. No. 640,890, now Patent No. 3,430,360, dated Mar. 4, 1969. Divided and this application Oct. 7, 1968, Ser. No. 765,593
Int. Cl. B29c *17/00*
U.S. Cl. 156—198                               3 Claims

ABSTRACT OF THE DISCLOSURE

The invention relates to a demonstration or teaching device wherein a semipermeable membrane in the form of a tube is sealed within a plastic tube of larger diameter together with water. Integrally attached to the larger tube is a container for salt. The end of said larger tube may be removed exposing the open end of the membrane tube, and when the salt is dropped into the latter, the water level therein rises above the water level in the larger tube by reason of osmotic pressure until equilibrium is attained. The invention also relates to a method of heat sealing semipermeable membrane tubes by dipping the same in alcohol or other solvent which replaces the water in the areas to be sealed, and then by applying heat to said areas sealing may be effected.

CROSS-REFERENCE

This application is a division of my copending application Ser. No. 640,890, filed May 24, 1967, now U.S. Pat. No. 3,430,360.

SPECIFICATION

This invention relates to semipermeable membranes and particularly to ion permeable membranes.

It is the principal object of the invention to produce a teaching or demonstration device which includes the use of semipermeable membranes, and it is an additional object of the invention to provide a new method of sealing such membranes.

Osmotic membranes have been used for some time in experiments and apparatus utilizing the process of osmosis and reverse osmosis. Membrane material is fabricated normally from cellulose acetate and when completed, actually contains close to fifty percent bound or contained water. Because of the presence of water in the membrane, it has heretofore not been possible to heat seal the membranes. According to the present invention, however, there is provided a simple and efficient method of rendering the area of the membrane where the seal is to be made sealable by the application of heat thereto.

While, as hereinbefore indicated, semipermeable membranes have been used in processes employing osmosis and reverse osmosis, there has existed a need of a single arrangement of such a membrane whereby the osmotic process may be visually demonstrated in a simple and inexpensive manner. According to the present invention, there is produced a simple demonstration kit which can be inexpensively made and easily used visually to demonstrate osmotic effects and pressures rendering the same particularly useful for student and classroom teaching purposes.

Thus, it is a further object of the present invention to produce a kit or ensemble utilizing a semipermeable membrane and a salt solution arranged in a manner to demonstrate the process of osmosis in a simple and readily understandable manner.

Other and further objects and advantages of the present invention will be readily apparent from the following description and drawings, in which:

FIG. 1 is a side elevational view partly broken away showing a step in the process of preparing a semipermeable membrane for heat sealing;

FIG. 2 shows the membrane of FIG. 1 after the same has been heat sealed;

FIG. 3 is a side elevational view partly in section illustrating an osmosis demonstration kit which may employ a heat sealed tube of the type shown in FIGS. 1 and 2; and FIG. 4 is a view like FIG. 3 illustrating the manner of using the demonstration kit shown.

While this invention is susceptible of embodiment in many different forms, there is shown in the drawings and will herein be described in detail several embodiments of the invention with the understanding that the present disclosure is to be considered as an exemplification of the principles of the invention and is not intended to limit the invention to the embodiments illustrated. The scope of the invention will be pointed out in the appended claims.

As previously pointed out, difficulty has heretofore been experienced in attempting to seal semipermeable membrane material because of the high water content of the membrane. According to this invention, however, it has been discovered that if the membrane material is dipped in a solution which will replace the water, for example, alcohol, the area which has been subjected to the alcohol treatment may readily be sealed by the application of heat in the usual fashion of heat sealing cellulose acetate materials. Thus, as shown in FIG. 1 of the drawings, a semipermeable membrane in the form of a tube 10 may be dipped in a container 11 containing alcohol 12 therein. After a few moments of immersion in the alcohol, the water in the membrane is replaced by the alcohol, whereupon the tube 10 may be subjected to pressure in a heat pulse in the usual fashion employed in plastic sealing techniques, and the result will be a heat seal such as shown at 13 in FIG. 2. After sealing, the membrane may be rinsed in water to remove traces of the alcohol.

The tube thus simply formed according to the method illustrated in FIGS. 1 and 2 may be used as part of an osmosis demonstration kit of the type shown in FIGS. 3 and 4. As is there shown, the tube 10 may be enclosed within a plastic tube 15 of larger diameter which is sealed at each end as illustrated at 16 and 17, and provided with a quantity of water 18 therein. The lower end of the tube 15 may be provided with two heat seals, heat seal 17 and a second seal 19 spaced therefrom to provide a compartment 20 in which a granulated salt 21 may be stored.

To demonstrate the process of osmosis the compartment 20 may be detached from the main portion of the tube 15 and the compartment opened so that the salt therein may be poured into the membrane tube 10 when the top portion 22 of the tube 15 has been cut off as illustrated in FIG. 4.

When salt is introduced into the water contained in the membrane tube, water within the outer tube 15, by surrounding the membrane tube, permeates the membrane by osmotic pressure and causes the level 23 of the liquid within the membrane tube to rise above the level 24 of liquid surrounding the same. When equilibrium is reached, i.e., hydrostatic pressure within the membrane tube is equal to the osmotic pressure, there will be no further rise of level of the liquid in the membrane tube.

The osmotic pressure demonstration kit thus described may obviously be inexpensively and simply made and is suitable to be passed out in classrooms for demonstration purposes. Inasmuch as the kit is exceedingly simple to use, the effect of osmotic pressure can simply and graphically be demonstrated to students for experimental and teaching purposes.

We claim:

1. The method of sealing a semipermeable membrane containing a substantial portion of bound water which comprises immersing a portion of the membrane in alcohol to remove the bound water therefrom, applying heat and pressure to said portion of the membrane to provide a seal, and thereafter treating the portion with water to remove the alcohol therefrom.

2. The method of heat sealing a cellulose semipermeable membrane containing on the order of 50% of bound water which comprises immersing a portion of the membrane in alcohol to remove the bound water therefrom, applying heat and pressure to said portion of the membrane to provide a seal, and thereafter treating said portion with water to remove traces of the alcohol.

3. The method of heat sealing the end of a cellulose acetate semi-permeable membrane having approximately fifty percent of bound water, said membrane being in the form of a tube, which comprises immersing one end of the tube in alcohol to remove the bound water therefrom, subjecting said end of the tube to heat and pressure to seal the same and thereafter treating the end with water to remove the alcohol therefrom.

References Cited

UNITED STATES PATENTS

| 1,964,724 | 7/1934 | Dreyfus | 156—307 |
| 2,399,338 | 4/1946 | Ford | 156—307X |
| 2,562,523 | 7/1951 | Brunet | 156—198 |

SAMUEL W. ENGLE, Primary Examiner

U.S. Cl. X.R.

156—83, 307